(12) United States Patent
Gupta et al.

(10) Patent No.: US 10,951,465 B1
(45) Date of Patent: Mar. 16, 2021

(54) DISTRIBUTED FILE SYSTEM ANALYTICS

(71) Applicant: EMC IP Holding Company LLC, Hopkinton, MA (US)

(72) Inventors: Nishesh Gupta, Sunnyvale, CA (US); Sandeep Nirmale, Santa Clara, CA (US); Deep Desai, Sunnyvale, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 187 days.

(21) Appl. No.: 15/280,932

(22) Filed: Sep. 29, 2016

(51) Int. Cl.
*H04L 12/24* (2006.01)
*H04L 29/08* (2006.01)

(52) U.S. Cl.
CPC ........ *H04L 41/069* (2013.01); *H04L 67/1097* (2013.01)

(58) Field of Classification Search
CPC .......................... H04L 41/069; H04L 67/1097
USPC .......................................................... 709/224
See application file for complete search history.

(56) References Cited

U.S. PATENT DOCUMENTS

| | | | |
|---|---|---|---|
| 8,069,366 B1* | 11/2011 | Wenzel ................. | H04L 69/18 714/6.3 |
| 8,595,184 B2* | 11/2013 | Zeng ................ | G06F 17/30997 707/611 |
| 9,888,397 B1* | 2/2018 | Puranik ................ | H04W 24/04 |
| 10,200,262 B1* | 2/2019 | Leverich ............... | H04L 41/142 |
| 2013/0304775 A1* | 11/2013 | Davis ................. | H04L 67/1097 707/827 |
| 2015/0082432 A1* | 3/2015 | Eaton .................... | G06F 9/5072 726/23 |
| 2015/0244795 A1* | 8/2015 | Cantwell ................. | G06F 16/27 709/202 |
| 2017/0046374 A1* | 2/2017 | Fletcher ................ | G06F 3/0482 |
| 2017/0264619 A1* | 9/2017 | Narayanaswamy .. | H04L 63/105 |
| 2017/0277715 A1* | 9/2017 | Strauss ............... | G06F 16/1865 |
| 2018/0357727 A1* | 12/2018 | Zhang ................. | G06Q 40/125 |

* cited by examiner

*Primary Examiner* — Esther B. Henderson
*Assistant Examiner* — Nazia Naoreen
(74) *Attorney, Agent, or Firm* — Workman Nydegger

(57) ABSTRACT

A method, article of manufacture, and apparatus for analyzing a distributed file system is discussed. A metadata operation is captured in an audit log, wherein the metadata operation is on an object stored in the distributed file system. An event is pushed to a distributed commit log and a real-time analytics engine in response to capturing the metadata operation. The event is persistently stored in the distributed commit log.

20 Claims, 3 Drawing Sheets

DISTRIBUTED FILE SYSTEM ANALYTICS

FIELD OF THE INVENTION

This invention relates generally to distributed file systems, and more particularly to systems and methods for collecting analytics data on distributed file systems.

BACKGROUND OF THE INVENTION

Distributed file systems manage files and folders spread across multiple computers. They may serve a similar function as traditional file systems, but are designed to provide file/folder storage and controlled access over local and wide area networks. Some individuals and/or enterprises may rely on distributed file systems to manage their personal and/or organizational data.

There is a need, therefore, for an improved method, article of manufacture, and apparatus for accessing a distributed file system.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
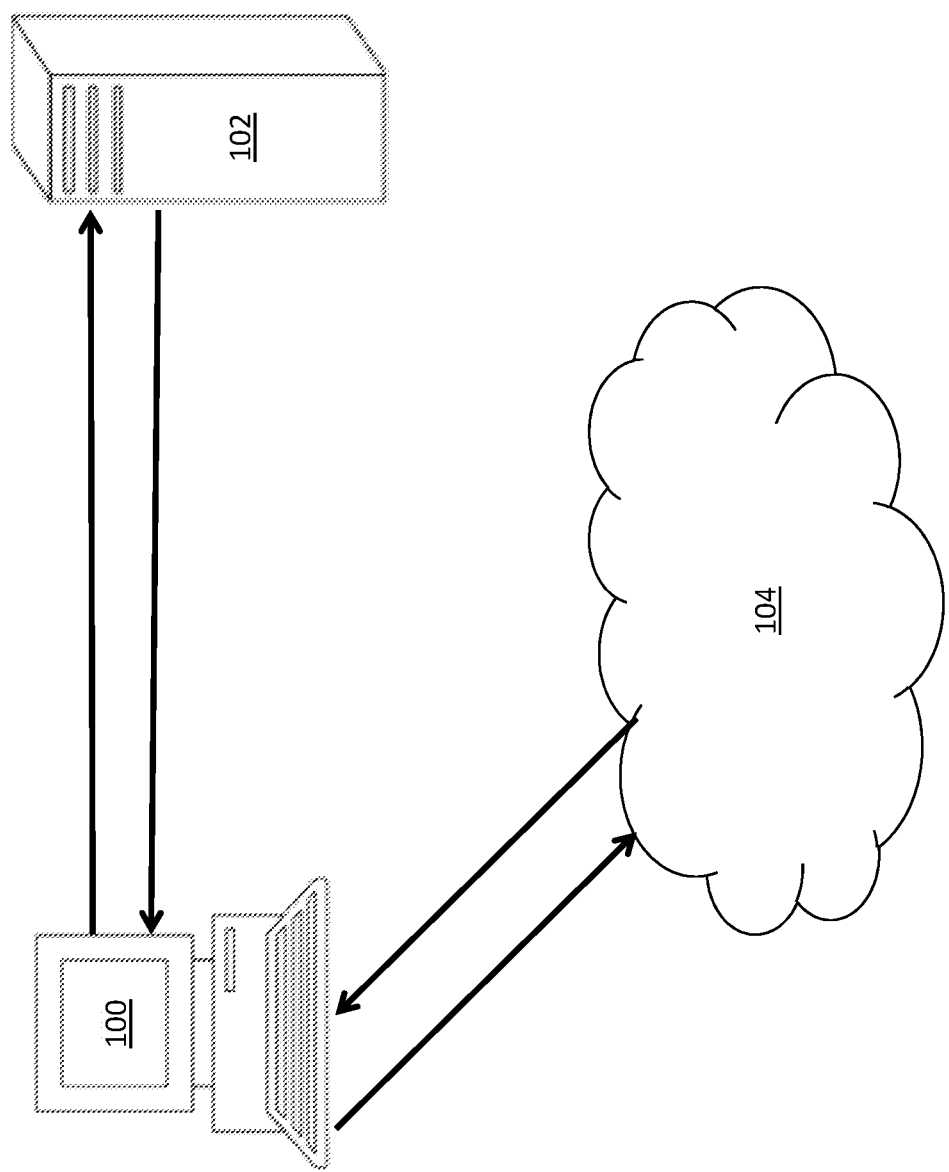
FIG. 1 depicts a system architecture for a distributed file system in a cloud environment consistent with an embodiment of the present disclosure

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Embodiments of the present disclosure provide an analytics mechanism for a distributed file system ("DFS"). Distributed files systems may be used to manage files, folders, and other data spread across multiple computing systems. They may be presented to users, applications, or other clients as traditional file systems, but may actually provide access to data over local and wide area networks. For example, the data could be stored in a cloud based object stores, such as Amazon S3, Microsoft Azure, Google Drive, a private object store, and/or a hybrid object store. Access to the data on these object stores may be managed by a metadata server ("MDS"), which could be a local or remote server from the client.

In some embodiments, the objects stores may be managed by multiple metadata servers. For example, a given client may have multiple different shares in the distributed file system, and each share may be accessed by a MDS. In some embodiments, each MDS may include a data log monitoring metadata actions on files within the system. Such actions may include read and/or write operations. Since each MDS contains its own log, however, gathering information to perform analytics on the distributed file system may be difficult. The data may need to be retrieved from each individual MDS, and may therefore become out of date by the time the retrieval process is complete. The present disclosure provides a system enabling analytics, even when each metadata server maintains its own log.

FIG. 1 depicts a system implementing a distributed file system in a cloud environment. The system of FIG. 1 may include client 100, MDS 102, and object store 104. While only one client 100 is shown, the system may include multiple clients accessing the distributed file system. Similarly, the system may include multiple object stores 104 and/or multiple MDS 102.

Client 100 may be any general purpose computing device. For example, client 100 may be a personal computer, workstation, handheld computer, smart phone, and/or tablet computer. Additionally or alternatively, client 100 may be a software module or application running on a general purpose computing device. Client 100 may be in communication with a MDS 102 and object store 104 over a network connection, such as a local area network ("LAN") or wide are network ("WAN"), or via any other form of communication. Client computer 100 may interact with the distributed file system as it would with a traditional file system, such as by writing data to and reading data from the distributed file system.

MDS 102 may be a general purpose computing device managing distributed file system metadata. This metadata could include, for example, the location of data stored in the distributed file system. MDS 102 may be a physical or a virtual machine, and may operate in an environment local to or remote from client 100. For example, MDS 102 may be a virtual machine operating in the same datacenter as client 100. Additionally or alternatively, MDS 102 may operate in a third party cloud environment, such as Amazon Web Services ("AWS"). In some embodiments, MDS 102 may operate in the same third party cloud environment as object store 104.

Object store 104 may comprise a storage location for storing data in the distributed file system. Object store 104 may be a private, public, or hybrid cloud environment capable of storing data. A private cloud may be an object store only available to clients belonging to a particular enterprise. For example, a private cloud may be an OpenStack Swift instance operating in a datacenter completely under the control of an enterprise. The install, including the associated data and services, may not be accessible to anyone outside of the enterprise. A public cloud may be any object store accessible to the public that requires authentication to access certain data. For example, Amazon S3 is available to members of the public but data stored in the object store is only accessible by authorized clients. A hybrid cloud may be a combination of a private and public cloud, such that some data is stored in the private cloud and other data is stored in the public cloud.

In some embodiments, client 100 may transmit communications to and receive responses from MDS 102. Similarly, client 100 may transmit communications to and receive responses from object store 104. Typically these communications will be IO requests and responses, such as read/write communications, though any other type of communication is consistent with the present disclosure.

For example, client 100 may decide to read data from the distributed file system. Client 100 may first mount the distributed file system by transmitting a mount request and/or intent to MDS 102. Similarly, if the distributed file system has already been mounted, client 100 may transmit a change location/directory request to MDS 102. In response, MDS 102 may consult a metadata table to determine data objects located at the root of the mount or in the new location, and transmit information related to the data back to client 100. This data could be, for example, a list of files and/or directories located at the root or new location. The data may also include a unique identifier for each data object, such as a hash and/or path of the object.

Once client 100 has a list of files and/or directories, client 100 may select a data object to read. Client 100 may transmit a read request identifying the desired data object back to MDS 102. In some embodiments, this read request may include a path or hash identifier for the data object the client desires. Once MDS 102 receives the request, it may attempt to locate the data object on the distributed file system.

In an embodiment, MDS 102 maintains location data for all of the data objects in the distributed file system. This location data may be maintained with other data object metadata in a database on MDS 102. For example, the database may comprise a table mapping a data object to one or more object store locations. These object store locations could reside, for example, on object store 104.

In response to the read request received from client 100, MDS 102 may consult the database table to determine the object location. MDS 102 may then return the object location back to client 100. In an embodiment, the object location returned might be a URL the client may use to access all or part of the data object. For example, the URL may comprise "http://<object store domain>/<container identifier>/<object identifier>", where <object store domain> is the domain of the object store, <container identifier> is an identifier for the distributed file system and/or a container on the object store used by the distributed file system, and <object identifier> identifies the object to be read. In an embodiment, the object identifier is a hash of the object and/or a hash of a version of the object.

Client 100 may attempt to access the data object once it receives the data object location from MDS 102. If the data object location is a URL, the client may issue an HTTP GET to the URL. For example, the client may issue a GET to object store 104 and/or the cloud service provider holding the data object. In response, object store 104 may return the requested data object to client 100.

The present system may also be used to write data objects to the distributed file system. This process may be similar to reading data objects, as discussed above. Once the distributed file system is mounted and client 100 has identified the file system location where it wishes to write the data, client 100 may transmit a write intent to MDS 102. This write intent may include the identified file system location and an object identifier for the data object client 100 intends to write. In some embodiments, this object identifier may be a hash of the data object or a hash of a version of the data object.

Upon receiving the intent, MDS 102 may consult a database table to determine if the data object has already been placed in an object store, such as object store 104. If the data object already exists, there is no need to write it to the object store a second time. MDS 102 may perform this check by comparing the provided object identifier to all of the object identifiers in the table. If there is a match, the data object exists. If there is not a match, the data object does not exist.

If the data object already exists in object store 104, client 100 may not need to transmit the data object to the store a second time. Instead, MDS 102 may create a new entry in the table comprising the object identifier and the location client 100 wishes to write the data. MDS 102 may then transmit a write complete notification to client 100, and the write process may terminate. Should client 100 issue a subsequent read for the object, MDS 102 may provide a URL to the data object on object 104 as discussed above. This process provides an inherent form of data deduplication by ensuring a data object is not written to the same object store multiple times.

If MDS 102 determines object store 104 does not have a copy of the data object (i.e. the object identifier is not found in the table), it may create a new entry for the object as discussed above. MDS 102 may additionally provide an object location back to client 100, and associate this object location with the new table entry. In some embodiments the object location is a URL constructed in the same manner as the URL generated during the read process.

Once client 100 receives the object location it may write the data object to that location. If the object location is a URL identifying an object store, such as object store 104, client 100 may write the data to that location using an HTTP POST and/or PUT. The POST and/or PUT request may include the data object client 100 wishes to store on object store 104. In some embodiments client 100 may conclude that the write was successful after the post was sent and terminate the write process. Alternatively, client 100 may wait for a confirmation from object store 104 before determining the write was successful.

While the above examples discuss reading and writing data objects as individuals, other configurations may exist. For example, individual data objects may be broken into a set of data chunks. Each of these data chunks may be stored and accessed on the object store in the same manner as the individual data objects discussed above. When a client wishes to read a data object, the client may submit identifiers for all the data object's constituent chunks to the MDS and receive a URL for each. Similarly, for writes the client may submit identifiers for all the data object's constituent chunks to the MDS. In response, the MDS may only provide write URLs for the chunks that do not already exist on the object store. If the chunks already exist the MDS may simply update the metadata table; there is no need to write the chunks a second time.

Figure 2:
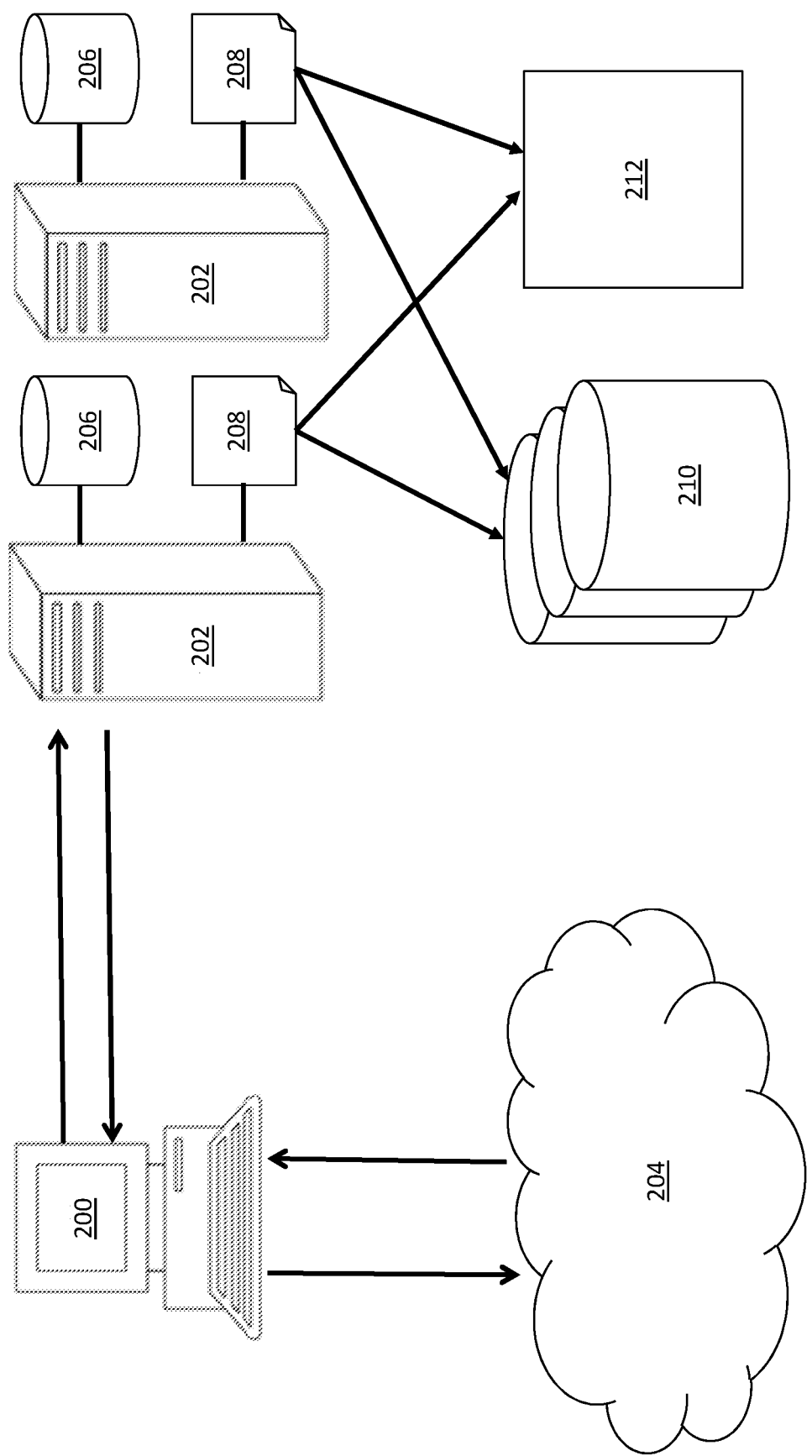
FIG. 2 depicts a system architecture collecting analytics information consistent with an embodiment of the present disclosure.

Turning now to FIG. 2, a system for performing data analytics within a distributed file system is discussed. The system may include client 200, MDS 202, and object store 204. These elements may be substantially similar to those discussed in reference to FIG. 1. Each MDS 202 may comprise database 206 and audit log 208.

In some embodiments, database 206 may comprise a database for persistently storing metadata about the distributed filesystem. For example, the database may include metadata about specific files, folders, or directories, such as inode data. Additionally or alternatively, the database may include the object identifier information discussed above. The database may also include general information about the system, such as access control lists, user lists, number of connected users, etc.

Some analytics information may be retrieved from the database using queries. For example, a user may query the database to determine how many files are there in the server, or how many users are configured to use the system. However, file system run time information like files currently open, or written in last few minutes are not stored in the metadata database. Querying a database, however, may require specialized knowledge, such as how the database is structured, or maybe resource intensive. As such, audit log 208 may be provided to manage analytics information.

Audit log 208 may be a log recording metadata operations being performed in the distributed file system. These metadata operations could include actions like file creation, deletion, access, etc. As clients make requests to the MDS and/or the database is updated, and auditing process may intercept the requests and store the actions in audit log 208. In some embodiments, each MDS may have its own audit log, and the audit log may be persistent or non-persistent.

Since each MDS has its own audit log, retrieving information for the system as a whole may be difficult. A client and/or analytics engine may need to access each audit log to retrieve the information since there is no central repository. For live data, the information may be stale by the time it has been retrieved. For example, if a client is trying to determine the number of users connected to the system, some users may have connected and/or disconnected by the time the retrieval process is complete. Additionally or alternatively, if the audit log is not persistent the desired information may be lost. For example, a client may try to determine the number of files that were opened yesterday. If the audit log has been removed and/or flushed since yesterday, that information may no longer be available. The system of FIG. 2 may address these concerns.

FIG. 2 depicts distributed commit log 210 and real-time analytics engine 212 in communication with audit logs 208. In some embodiments, these features may improve the distributed file systems analytics capabilities. As metadata operations are stored in audit log 208, an event engine may create and push an event to both distributed commit log 210 and real-time analytics engine 212. The event may comprise any information stored in the audit log, and may also include information about the MDS pushing the event. For example, the event may include a system identifier for the specific MDS pushing the event.

Distributed commit log 210 may comprise a log, database, or other structure for persistently storing data received from audit logs 208. In some embodiments, distributed commit log 210 may include a temporal relationship between the events. For example, distributed commit log 210 may maintain an order in which the events occur. The temporal relationship may be maintained across multiple MDS, and/or may be specific for a given MDS. For example, the order of events may be the order they occurred on a single MDS, or the order in which they occurred across each MDS.

In some embodiments, distributed commit log 210 may comprise a scalable cluster of nodes. As the commit log grows, additional nodes may be added to accommodate the new data. Nodes could be, for example, general purpose computers and/or virtual machines. In some embodiments, the distributed commit log may comprise Apache Kafka.

FIG. 2 also includes real-time analytics engine 212. Real-time analytics engine may comprise a high-speed, scalable data store for managing live MDS data. For example, real-time analytics engine 212 may aggregate the number of users connected to the system, number of open files, etc. In some embodiments, unlike distributed commit log 210, real-time analytics engine 212 may not be persistent. Additionally, real-time analytics engine 212 may be substantially smaller than distributed commit log 210 as it only stores live data, not legacy information. In some embodiments, real-time analytics engine 212 may comprise Apache Spark.

Distributed commit log 210 and real-time analytics engine 212 may together form a central repository for accessing metadata spread between multiple MDS. This metadata may be used for system diagnostics and/or analytics purposes. In some embodiments, distributed commit log 210 and real-time analytics engine 212 may operate onsite with one or more MDS. Additionally or alternatively, they may operate in the cloud, such as on object store 204. In some embodiments, they may be accessed from client 200, and/or they may be accessed by a central management system.

Figure 3:
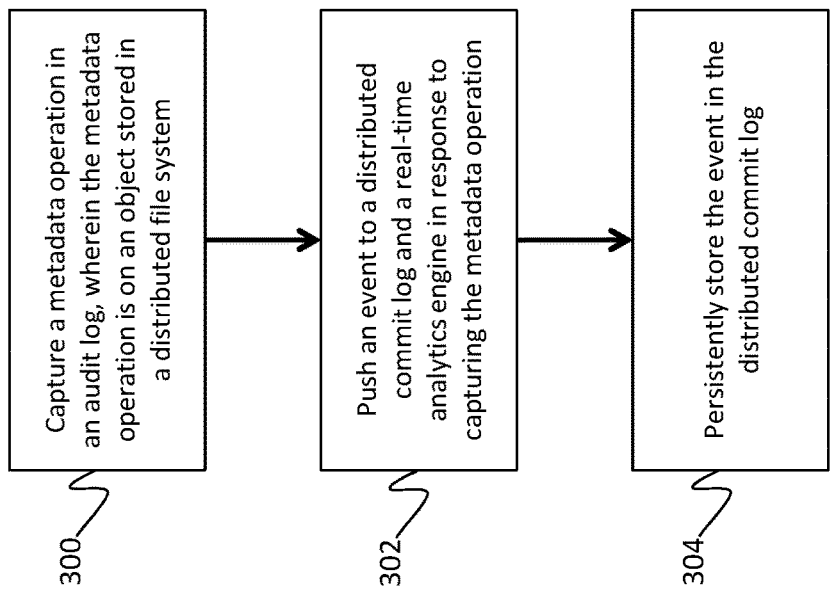
FIG. 3 depicts a process for analyzing data on a distributed file system consistent with an embodiment of the present disclosure.

Turning now to FIG. 3, a process for performing data analytics on a distributed file system is discussed.

At block 300, a metadata operation may be captured at an audit log. This metadata operation and audit log may be substantially similar to those discussed above. In some embodiments, the metadata operation may be on an object stored in the distributed file system, such a file and/or a directory.

At block 302, an event may be pushed to a distributed commit log and a real-time analytics engine. The event may include the metadata operation and/or an identifier associated with a MDS capturing the event.

Finally, at block 302, the event may be stored persistently at the distributed commit log. Additionally or alternatively, the event may be stored non-persistently at the real time analytics engine.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method comprising:
    intercepting a request transmitted by a client to a metadata server (MDS), and the request transmitted by the client implicates a metadata operation;
    capturing the metadata operation in an audit log of the metadata server (MDS), wherein the metadata operation is on an object stored in a distributed file system (DFS);
    pushing, by the metadata server (MDS), an event to a distributed commit log and to a real-time analytics engine that is in communication with a plurality of audit logs including the audit log of the metadata server (MDS), and the real-time analytics engine collects analytics information about the DFS from the audit log and cooperates with the distributed commit log to enable client access to metadata spread across a plurality of metadata servers (MDS), and the real-time analytics engine is smaller than the distributed commit log and the real-time analytics engine stores only live data and not legacy information, and the event is pushed to the distributed commit log and the real-time analytics engine in response to capturing the metadata operation, wherein the distributed commit log is shared by the plurality of metadata servers (MDS) which are each associated with a respective audit log and the distributed commit log receives events from the plurality of metadata servers (MDS) that have been captured in the respective audit logs of those metadata servers (MDS); and
    persistently storing the event in the distributed commit log.

2. The method of claim 1, wherein the distributed commit log comprises a scalable cluster of nodes.

3. The method of claim 1, wherein the event is non-persistently stored at the real-time analytics engine.

4. The method of claim 1, wherein the real-time analytics engine enables user access to system runtime information that is not stored in a metadata database associated with one of the metadata servers (MDS).

5. The method of claim 1, wherein the real-time analytics engine maintains a state of the DFS.

6. The method as recited in claim 1, wherein the method is performed by a metadata server (MDS) that is part of a system that includes one or more other MDS.

7. The method as recited in claim 1, wherein the metadata operation comprises an action specified by a user concerning data in the DFS.

8. A non-transitory storage medium having stored therein instructions which are executable by one or more processors to perform operations comprising:
    intercepting a request transmitted by a client to a metadata server (MDS), and the request transmitted by the client implicates a metadata operation;
    capturing the metadata operation in an audit log of the metadata server (MDS), wherein the metadata operation is on an object stored in a distributed file system (DFS);
    pushing, by the metadata server (MDS), an event to a distributed commit log and to a real-time analytics engine that is in communication with a plurality of audit logs including the audit log of the metadata server (MDS), and the real-time analytics engine collects analytics information about the DFS from the audit log and cooperates with the distributed commit log to enable client access to metadata spread across a plurality of metadata servers (MDS), and the real-time analytics engine is smaller than the distributed commit log and the real-time analytics engine stores only live data and not legacy information, and the event is pushed to the distributed commit log and the real-time analytics engine in response to capturing the metadata operation, wherein the distributed commit log is shared by the plurality of metadata servers (MDS) which are each associated with a respective audit log and the distributed commit log receives events from the plurality of metadata servers (MDS) that have been captured in the respective audit logs of those metadata servers (MDS); and
    persistently storing the event in the distributed commit log.

9. The non-transitory storage medium of claim 8, wherein the distributed commit log comprises a scalable cluster of nodes.

10. The non-transitory storage medium of claim 8, wherein one of the events comprises information about the MDS that pushed the event and/or information stored in one of the audit logs.

11. The non-transitory storage medium of claim 8, wherein the real-time analytics engine enables user access to system runtime information that is not stored in a metadata database associated with one of the metadata servers (MDS).

12. The non-transitory storage medium of claim 8, wherein the real-time analytics engine maintains a state of the DFS.

13. A system comprising a computer processor configured to execute instructions for performing operations comprising:
    intercepting a request transmitted by a client to a metadata server (MDS), and the request transmitted by the client implicates a metadata operation;
    capturing the metadata operation in an audit log of the metadata server (MDS), wherein the metadata operation is on an object stored in a distributed file system (DFS);
    pushing, by the metadata server (MDS), an event to a distributed commit log and to a real-time analytics engine that is in communication with a plurality of audit logs including the audit log of the metadata server (MDS), and the real-time analytics engine collects analytics information about the DFS from the audit log and cooperates with the distributed commit log to enable client access to metadata spread across a plurality of metadata servers (MDS), and the real-time analytics engine is smaller than the distributed commit log and the real-time analytics engine stores only live data and not legacy information, and the event is pushed to the distributed commit log and the real-time analytics engine in response to capturing the metadata operation, wherein the distributed commit log is shared by the plurality of metadata servers (MDS) which are each associated with a respective audit log and the distributed commit log receives events from the plurality of metadata servers (MDS) that have been captured in the respective audit logs of those metadata servers (MDS); and persistently storing the event in the distributed commit log.

14. The system of claim 13, wherein the distributed commit log comprises a scalable cluster of nodes.

15. The system of claim 13, wherein one of the events comprises information about the MDS that pushed the event and/or information stored in one of the audit logs.

16. The system of claim 13, wherein the real-time analytics engine enables user access to system runtime information that is not stored in a metadata database associated with one of the metadata servers (MDS).

17. The system of claim 13, wherein the real-time analytics engine maintains a state of the DFS.

18. The system of claim 13, wherein the computer processor is an element of a metadata server (MDS), and the system further comprises one or more additional MDS, each of which maintains its own respective audit log.

19. The system of claim 13, wherein the real-time analytics engine comprises a scalable data store operable to manage live metadata server (MDS) data.

20. The system of claim 13, wherein the real-time analytics engine and distributed commit log together form a central repository of metadata spread among multiple metadata servers (MDS).

* * * * *